N. R. MOORE.
AUTOMOBILE CAMP TRAILER.
APPLICATION FILED MAR. 28, 1919.

1,386,943.

Patented Aug. 9, 1921.
5 SHEETS—SHEET 1.

WITNESSES
J. Herbert Bradley.

INVENTOR
Ninian R. Moore
By Jno. S. Green
attorney.

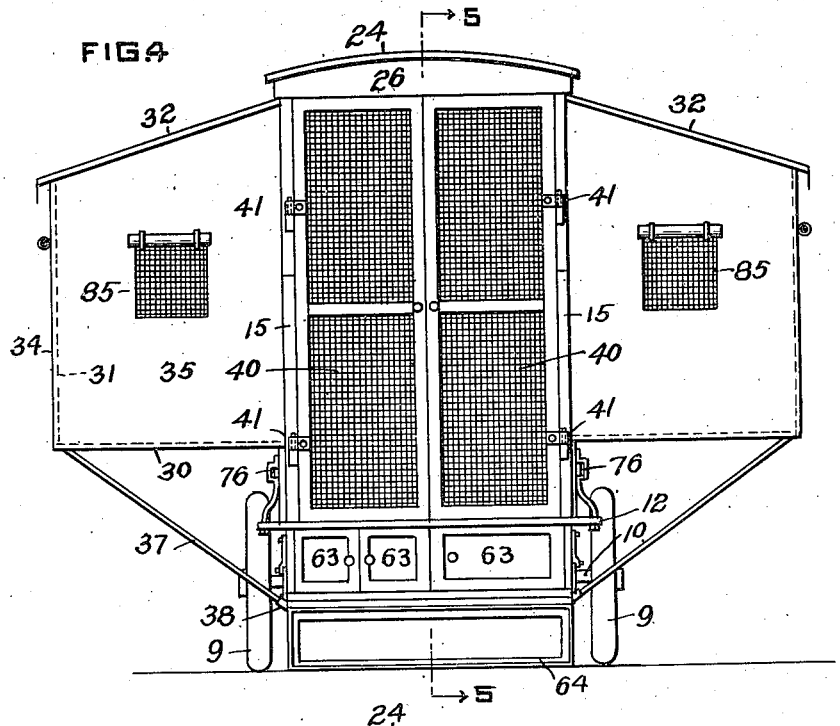
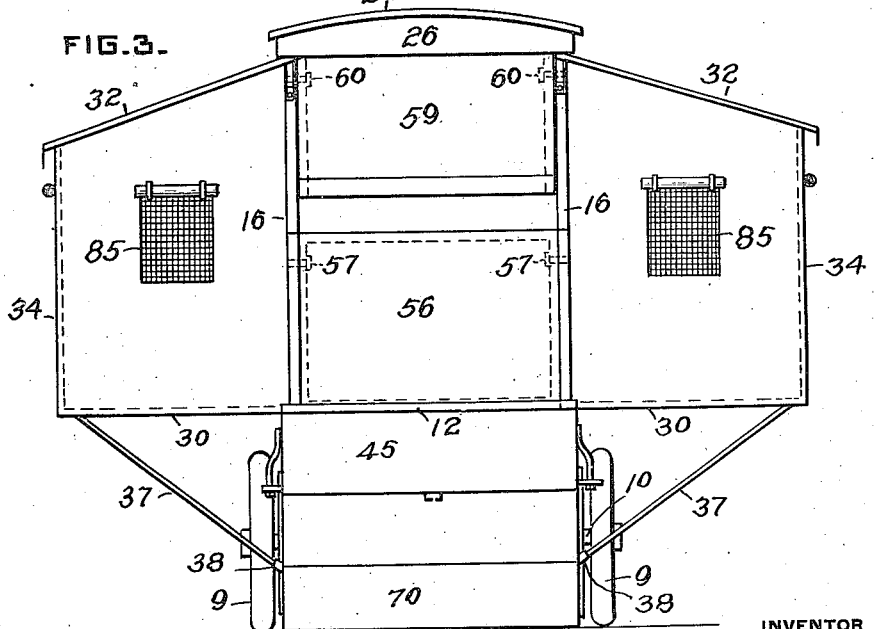

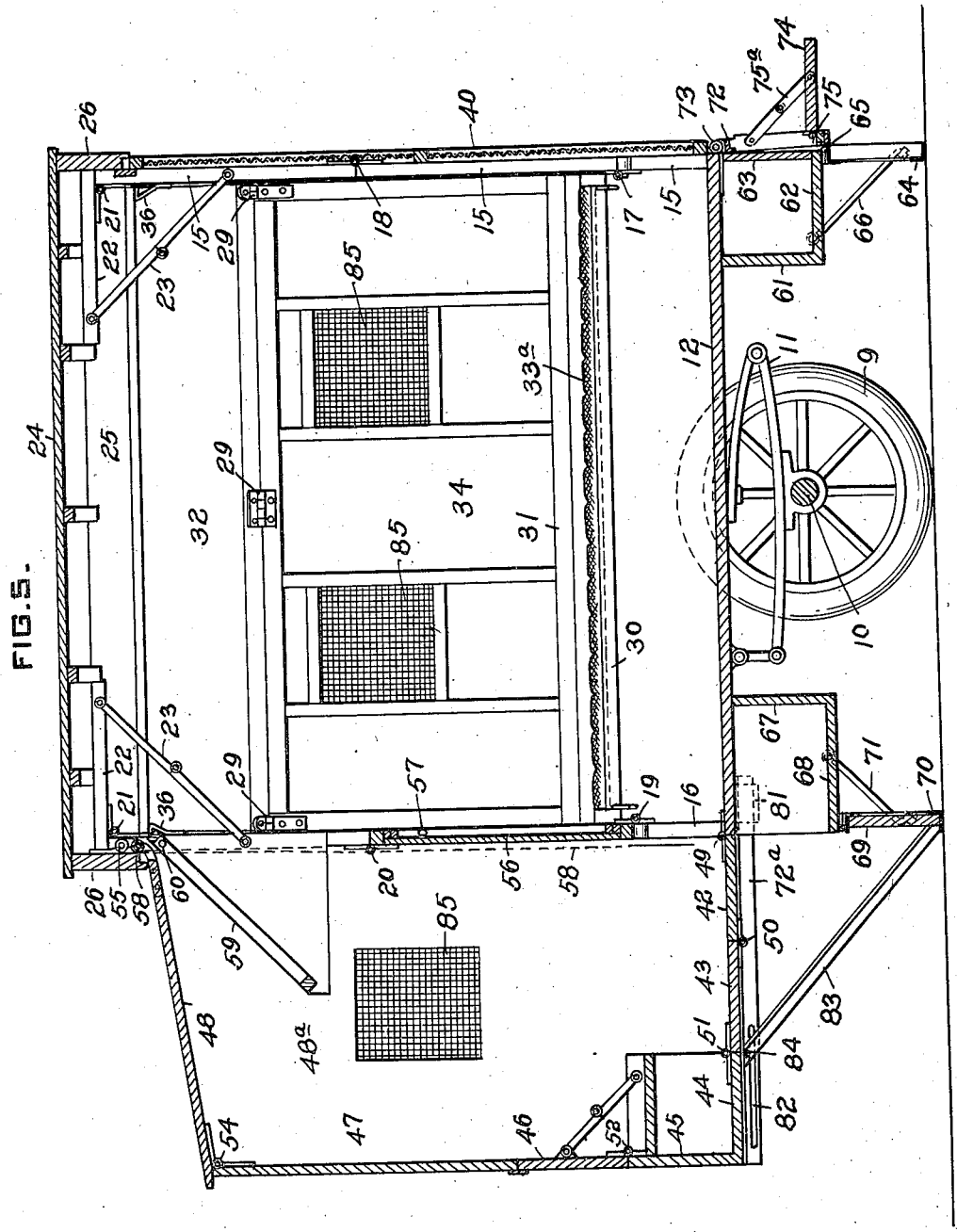

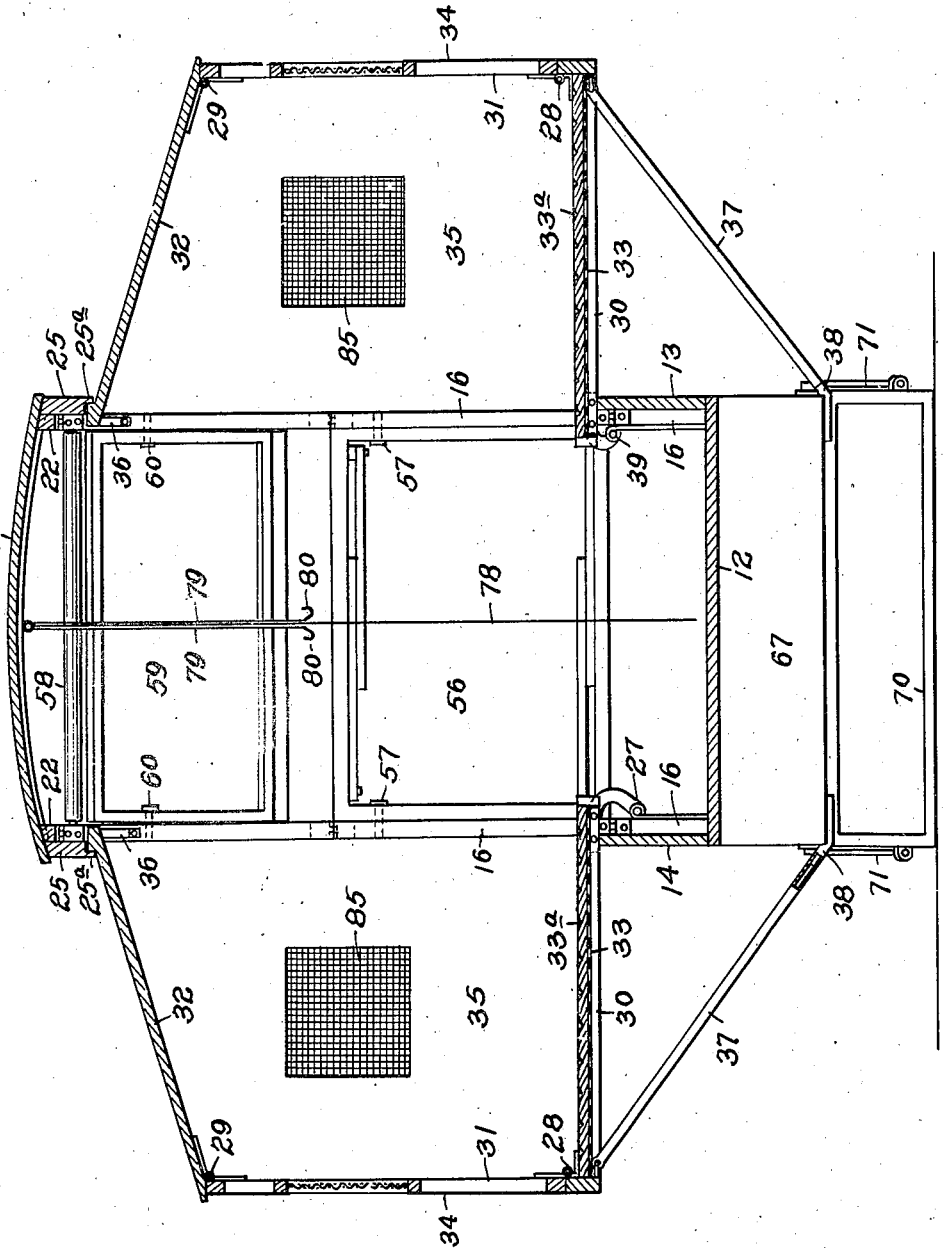

N. R. MOORE.
AUTOMOBILE CAMP TRAILER.
APPLICATION FILED MAR. 28, 1919.

1,386,943.

Patented Aug. 9, 1921.
5 SHEETS—SHEET 5.

UNITED STATES PATENT OFFICE.

NINIAN R. MOORE, OF DUBOIS, PENNSYLVANIA.

AUTOMOBILE CAMP-TRAILER.

1,386,943.   Specification of Letters Patent.   Patented Aug. 9, 1921.

Application filed March 28, 1919. Serial No. 285,802.

*To all whom it may concern:*

Be it known that I, NINIAN R. MOORE, a citizen of the United States, and a resident of Dubois, in the county of Clearfield and State of Pennsylvania, have made a new and useful Invention in Automobile Camp-Trailers, of which the following is a specification.

The object of my invention is to provide a compact dust and weather proof container for sleeping and cooking equipment in the form of an automobile trailer which may be quickly transformed into complete sleeping and cooking compartments and quickly returned to traveling condition.

Figure 2:
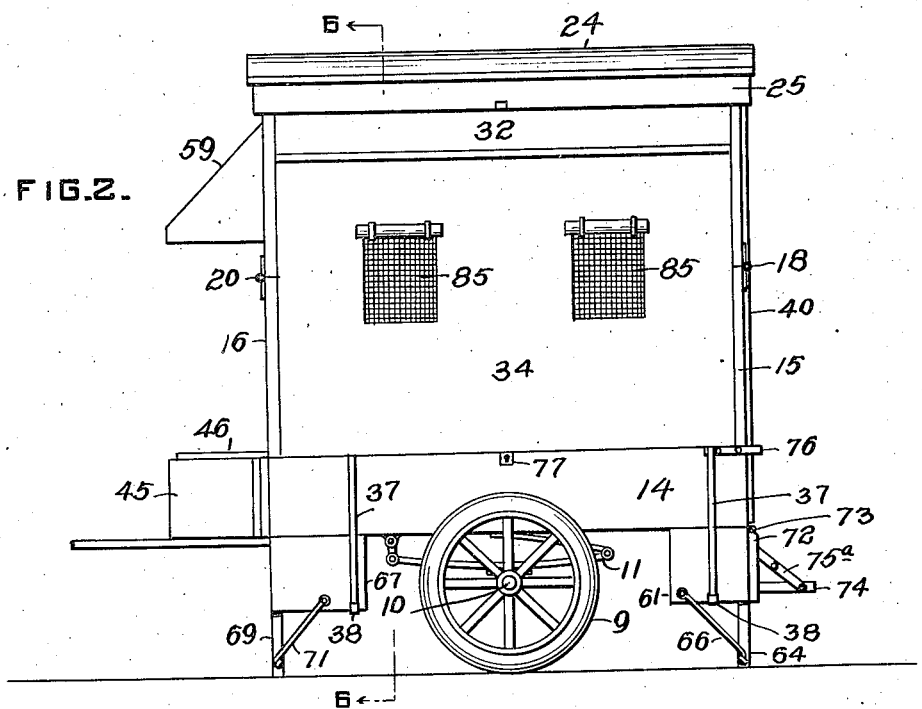
Figure 1:
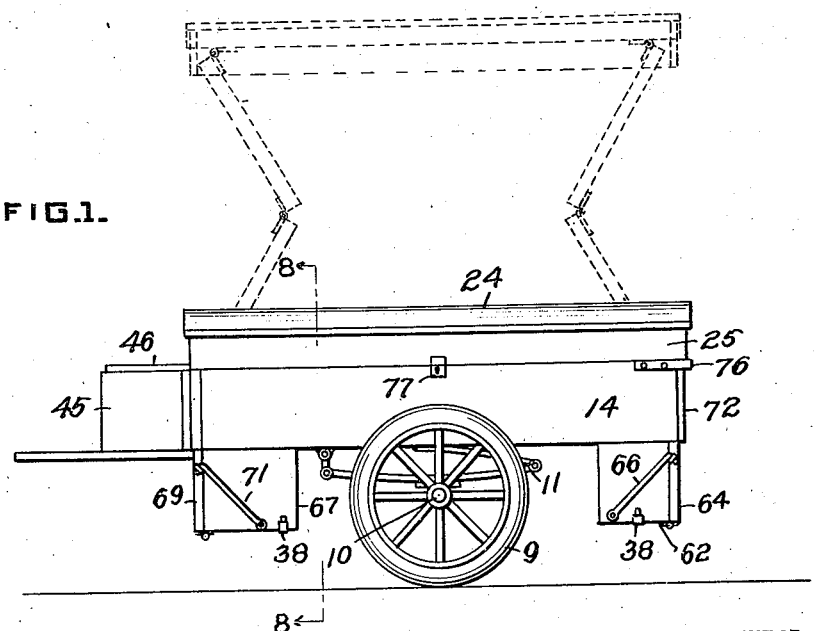

In the drawings forming a part of this specification, Figure 1 is a side elevation of the trailer as it appears when folded and ready for traveling; Fig. 2 is a similar elevation when the trailer is open and ready for occupancy as a sleeping compartment; Fig. 3 is a front view when the trailer is in use as described in Fig. 2; Fig. 4 is a rear view of the trailer set up; Fig. 5 is a vertical longitudinal section taken on line 5—5 of Fig. 4 showing complete open arrangement; Fig. 6 is a vertical transverse section taken on line 6—6 of Fig. 2; Fig. 7 is a longitudinal vertical section through the center of the trailer when it is folded for traveling; Fig. 8 is a transverse vertical section on line 8—8 of Fig. 1. In this description that part of the trailer nearest the automobile as indicated by the draw bar is termed the front.

Wheels 9 are mounted upon an axle 10 carrying springs 11 supporting the body which has floor 12 and sides 13 and 14. Two standards 15 at the rear and two similar ones 16 at the front are made in sections hinged at 17, 18 and 19, 20, respectively. Hinged to the top of each standard at 21 is a short purline 22 supported when in the position shown in Fig. 5 by toggle 23. These purlines support the roof 24 which has depending side plates 25 and end plates 26. By breaking toggles 23, folding standards 15 and 16 on hinges 17, 18 and 19, 20 and purlines 22 on hinges 21, the roof is lowered to the position shown in Fig. 7 and as indicated in Fig. 8 plates 25 rest upon sides 13 and 14, the lips 25ᵃ overlapping the sides.

Referring to the left hand side of Fig. 6; hinged at 27, 28 and 29 are frames 30, 31 and panel 32. Frame 30 is preferably made of angle iron to which is attached a bed spring 33 of woven wire or other flat type supporting a mattress 33ᵃ. Frame 31 is covered with canvas or other flexible material 34 which extends at the front and rear of the frame to form end walls 35 and is there attached at the bottom to frame 30 and at the top to panel 32. Panel 32 has a hooked end engaging the lip 25ᵃ and is supported in its position by a flat spring 36 on standards 15 and 16. The outer ends of struts 37 are pivotally connected to the outer side of frame 30, the other ends formed with a socket adapted to be seated on projections 38 attached to boxes under the body of the trailer. By depressing spring 36, panel 32 may be folded upon covered frame 31, walls 35 may be collapsed inwardly and the panel, frame and end walls folded at 28 upon frame 30. All of above may then be turned on hinge 27 to lie near or upon bottom 12 of the body, unseated strut 37 folding upon its pivot to a position lengthwise of frame 30. The right hand side of the trailer is constructed and folded similarly except that the shorter arm on hinge 39 will bring the right hand section, when folded, above the left hand section as shown in Fig. 8.

In Fig. 4, 40 indicates screened or paneled doors hung upon hinges 41. These hinges are of a type which permit the door to be readily unhung and stowed on the body floor as shown in Figs. 7 and 8. Obviously, a curtain or button flaps may be substituted for these doors.

Fig. 5 illustrates the kitchenette in which sections 42, 43, 44, 45 and 46 form a floor and lower end wall and sections 47 and 48 form an upper end wall and roof. These sections are hinged or joined at 49, 50, 51, 52, 54 and 55, respectively. When these sections are folded as shown in Fig. 7 section 42 is in a vertical position and forms the front end of the trailer body supporting the roof end plate 26.

Figs. 2 and 5 illustrate the front lower end wall of the sleeping compartment formed by a table 56 with folding legs. The table fits between standards 16 and is detachably secured thereto by pins 57. It may be removed for table purposes or to provide entrance to the kitchenette. 58 indicates a roller shade which may be drawn down to close the opening above table 56 or the opening may be shielded by an awning 59 detachably secured to standards 16 by pins 60. These would generally only be used when the kitchenette has not been opened out.

As best shown in Figs. 4 and 5, below body floor 12 and at each end thereof are boxes for storing food, ice and cooking utensils. The rear box is formed by wall 61, bottom 62 and door 63. This box may be lined and insulated to form a refrigerator. A frame 64 surrounds the rear of this box and is hinged at 65 so that it may swing downward and form a support for the rear of the trailer. The hook 66 secures it in either position. The forward box is formed by wall 67, bottom 68 and door 69 hinged at the bottom to swing downward to form a support to the front of the trailer. This door is provided with a frame 70. When the frames 64 and 70 are closed they seal the joints between their respective doors 63 and 69 and the edges of their respective boxes. The latter frame is secured in either position by hook 71.

An angle 72$^a$ is secured to the bottom of kitchenette section 44 and slidably secured to bottom of trailer body at 81 and provided with a slot 82 at its forward end. An angle 83 is slidably and pivotally connected to angle 72$^a$ by a pin 84 through slot 82. When the kitchenette is opened these angles are drawn out from under the body of the trailer, the pin 84 may be seated in the niche in slot 82 and the rear end drop to brace angle 72 from the frame 70.

The rear of the trailer body is formed by a frame 72 hinged at 73 and fitted with a panel 74 hinged to the frame at 75 so that when frame 72 is swung down it forms a riser or support for the step formed by panel 74 swung out and held in a horizontal position by toggle 75$^a$. When folded, frame and panel are secured by spring clips 76.

The top of the side and ends of the body and the bottom of the side and end plates of the roof are preferably weather stripped to keep out dust and rain when trailer is closed for traveling and are then suitably clamped tightly together by lock 77. A curtain 78 is suspended from the roof dividing the sleeping compartment into two small rooms. Strap 79 supports hooks 80 to hold clothing, etc.

It is obvious that in a vehicle of this type a multitude of variations may be made and I do not wish to limit my construction to forms indicated. Any panel may be of either flexible material such as canvas or pantasote or rigid material such as beaver board, aluminum or steel and as indicated at 85 may be fitted with screened or translucent openings for ventilation and lighting. Any section may be detachable instead of hinged as shown and sliding joints may be substituted for hinged ones in many places without departing from the spirit of my invention.

When the trailer is to be opened up the top is unlocked and by raising the roof the standards 15 and 16 are brought into position. The righthand sleeping section is unfolded, the struts 37 seated and when the roof section 32 is secured as illustrated and described the end walls 35 are in place. The operation is repeated on the lefthand side and by hanging the doors 40 the sleeping compartment is ready for occupancy. These operations require a minimum of time and effort and when needed the kitchenette compartment can be set up with the same ease of operation. The sides 48$^a$ of the kitchenette are of flexible material attached to sections 47 and 48 and extend downwardly to the floor. These sides collapse between sections 47 and 48 when the latter are folded.

I claim:—

1. In an automobile trailer, a shallow body having solid sides and a solid cover resting on said sides, frames within said body and hinged to same and to each other, and means for supporting said cover spaced from said body, said frames being adapted to be swung out of said body into horizontal, vertical and sloping positions so as to form floor, wall and roof portions of a habitable compartment.

2. In an automobile trailer, a shallow body, a solid top resting on the sides thereof and adapted to be raised, means operative automatically to support said top when same is moved to raised position, hinged sections adapted to lie within said body and below said top when the latter is resting on said sides, and adapted to be unfolded to form floor beds, side walls and roof portions of a sleeping compartment, and end wall sections adapted to be automatically erected when said hinged sections are unfolded.

3. A collapsible compartment for an automobile trailer comprising a rigid bottom, a rigid side hinged thereto, a rigid roof hinged to said side, and flexible end walls adapted to be collapsed, when said roof, side and bottom are folded together, without being detached therefrom.

4. A two-wheeled automobile trailer having storage boxes below the body and at each end thereof, doors for said boxes, and angular frames adapted to seal the joints between said boxes and said doors, when the latter are closed, or to support said trailer from the ground.

5. In an automobile trailer, a pair of wheels, a body mounted thereon, boxes before and behind said wheels and beneath said body, doors for said boxes and hinged frames adapted to seal the joints between said boxes and doors or to be swung downwardly to steady said body when at rest.

6. In an automobile trailer, a body having low sides and ends, compartment-forming sections hinged to said body and movable from a position between the sides of said body to a position above and beyond said sides to form a compartment, a top section operatively connected to said body and movable to a raised position above the body or to a lowered position in contact with the upper edge thereof, and hinges between said hinged sections and said body so formed and so secured to the body that the hinged sections are swung downwardly below the upper edges of the body on being moved between the sides thereof whereby the top is capable of engaging the upper edges of the body when in the lowered position.

7. In an automobile trailer, a body, a top therefor adapted to be raised to form the roof of a compartment, panels hinged to said top and to each other and adapted to be unfolded to form a roof and upper end wall, a storage box consisting of hinged sections adapted to unfold to form a floor and lower end wall, and flexible walls secured to said panels and sections and combining therewith to form an additional compartment.

8. In an automobile trailer, a body, a box beneath said body at the end thereof, a door closing said box, a frame adapted to seal the joint between said door and body or to be swung into a position where it supports said box from the ground.

9. In an automobile trailer, a body, a storage box below the end of said body, a door adapted to position to close said box or to support the trailer from the ground and a hook on said box adapted to secure said door in either position.

10. In an automobile trailer, a body, an end gate for same, a storage box below said body and having a door immediately below and approximately alined with said end gate and means for swinging said gate to a horizontal position so as to form a step to said body from the ground and below said door.

11. In an automobile trailer, a shallow body having rigid, impervious sides and ends, and a rigid, impervious top provided with impervious, depending side and end plates adapted to rest upon and overlap the edges of said body portions, weather stripping between said plates and body portions, means for holding said top in a raised position above said body, and covered frames foldable within said body and adapted to be moved to position coöperating with said elevated top to form a camping compartment.

12. In an automobile trailer, a body consisting of a bottom and low, vertical sides and ends, a bed section adjacent each of said sides, hinges connecting each of said sides with its adjacent bed section so that the latter may swing to extend outwardly from its respective side or to lie between said sides; the hinge connecting one side and its respective bed section being shorter than the hinge for the opposite side and section, and said hinges being positioned on the respective sides so that when said bed sections are swung between said sides they will lie parallel and the section provided with the shorter hinge will be above the section provided with the longer hinge.

13. In a camp trailer, a body having a bottom and low, vertical sides, compartments extending outwardly from each of said sides and comprising floor, side wall and roof sections so hinged together that they may fold to adjacent parallel positions, hinges connecting one section of each compartment with its respective side; the hinges for the section on one side being secured thereto at a height varying from the height of the securing point of the hinges for the section on the opposite side, whereby said compartment sections, when folded as described, may swing between said sides with the folded compartment connected to the body by the longer hinge positioned on or near the bottom of the body and parallel therewith, and the folded compartment connected to the body by the shorter hinge positioned above the other compartment and parallel therewith.

In testimony whereof I have hereunto subscribed my name this 10th day of March, 1919.

NINIAN R. MOORE.